United States Patent
Nakazawa et al.

(10) Patent No.: US 8,991,445 B2
(45) Date of Patent: Mar. 31, 2015

(54) HYDROGEN FILLING SYSTEM AND METHOD OF OPERATING THE SAME

(75) Inventors: Koji Nakazawa, Wako (JP); Masanori Okabe, Wako (JP); Jun Takeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 892 days.

(21) Appl. No.: 13/186,451

(22) Filed: Jul. 19, 2011

(65) Prior Publication Data
US 2012/0018033 A1 Jan. 26, 2012

(30) Foreign Application Priority Data
Jul. 20, 2010 (JP) ................. 2010-162699

(51) Int. Cl.
*F17C 5/00* (2006.01)
*H01M 8/06* (2006.01)
*H01M 8/04* (2006.01)

(52) U.S. Cl.
CPC ....... *H01M 8/0656* (2013.01); *F17C 2221/012* (2013.01); *F17C 2225/0123* (2013.01); *F17C 2265/065* (2013.01); *F17C 2270/0139* (2013.01); *H01M 8/04201* (2013.01); *H01M 8/04208* (2013.01); *Y02E 60/50* (2013.01); *Y02E 60/321* (2013.01); *Y02E 60/364* (2013.01)
USPC ......... 141/95; 141/2; 141/5; 141/82; 141/197

(58) Field of Classification Search
CPC ......... C25B 1/04; F17C 5/06; F17C 2250/01; F17C 2270/0168; F17C 2270/0171; F17C 2270/0178
USPC ................. 141/2, 5, 82, 94–95, 197
See application file for complete search history.

(56) References Cited

U.S. PATENT DOCUMENTS

| 6,598,624 | B2 * | 7/2003 | Togasawa et al. ................. 141/1 |
| 6,755,225 | B1 * | 6/2004 | Niedwiecki et al. .......... 141/231 |
| 6,779,568 | B2 * | 8/2004 | Borck .............. 141/67 |
| 6,792,981 | B1 * | 9/2004 | Manning et al. .................. 141/3 |
| 6,810,925 | B2 * | 11/2004 | Graham et al. ................. 141/98 |

(Continued)

FOREIGN PATENT DOCUMENTS

| CN | 1887622 | 1/2007 |
| JP | 2005-069332 | 3/2005 |

OTHER PUBLICATIONS

Chinese Office Action for corresponding CN Application No. 201110201998.8, Oct. 12, 2013.

*Primary Examiner* — Nicolas A Arnett
(74) *Attorney, Agent, or Firm* — Mori & Ward, LLP

(57) ABSTRACT

A hydrogen filling system to fill a hydrogen fuel tank with hydrogen includes a high-pressure water electrolysis device capable of electrolyzing water to produce oxygen and the hydrogen. A hydrogen pipe connects the high-pressure water electrolysis device and a filling mechanism to fill the hydrogen fuel tank with the hydrogen. At least one hydrogen storage tank is provided to the hydrogen pipe to store the hydrogen produced by the high-pressure water electrolysis device at substantially a same pressure as a maximum filling pressure of the hydrogen fuel tank. A first valve mechanism is arranged downstream of the at least one hydrogen storage tank. A bypass pipe is provided to the hydrogen pipe and connects the high-pressure water electrolysis device and the filling mechanism to bypass the at least one hydrogen storage tank and the first valve mechanism. A second valve mechanism is arranged on the bypass pipe.

17 Claims, 6 Drawing Sheets

(56) References Cited

U.S. PATENT DOCUMENTS

| | | | |
|---|---|---|---|
| 7,147,690 B2* | 12/2006 | Shimada et al. | 95/106 |
| 7,275,569 B2* | 10/2007 | Hobbs | 141/97 |
| 7,287,558 B2* | 10/2007 | Hobbs | 141/97 |
| 7,624,770 B2* | 12/2009 | Boyd et al. | 141/11 |
| 8,053,118 B2* | 11/2011 | Takahashi et al. | 429/411 |
| 8,091,593 B2* | 1/2012 | Allidieres | 141/82 |
| 8,151,834 B2* | 4/2012 | Kurita et al. | 141/105 |
| 8,329,020 B2* | 12/2012 | Takeuchi et al. | 205/637 |
| 8,366,887 B2* | 2/2013 | Okabe et al. | 204/266 |
| 8,663,434 B2* | 3/2014 | Takeuchi | 204/228.5 |
| 2003/0175564 A1* | 9/2003 | Mitlitsky et al. | 429/21 |
| 2004/0118476 A1* | 6/2004 | Borck | 141/4 |
| 2004/0131902 A1* | 7/2004 | Frank et al. | 429/21 |
| 2005/0000802 A1* | 1/2005 | Hobbs | 204/277 |
| 2005/0003246 A1* | 1/2005 | Shimada et al. | 429/17 |
| 2006/0180240 A1* | 8/2006 | Niedzwiechi et al. | 141/231 |
| 2009/0151812 A1* | 6/2009 | Allidieres | 141/11 |
| 2010/0051473 A1* | 3/2010 | Okabe et al. | 205/637 |
| 2010/0193070 A1* | 8/2010 | Allidieres | 141/11 |
| 2010/0206740 A1* | 8/2010 | Takeuchi et al. | 205/338 |
| 2010/0219066 A1* | 9/2010 | Takeuchi et al. | 204/242 |

* cited by examiner

HYDROGEN FILLING SYSTEM AND METHOD OF OPERATING THE SAME

CROSS-REFERENCE TO RELATED APPLICATIONS

The present application claims priority under 35 U.S.C. §119 to Japanese Patent Application No. 2010-162699, filed Jul. 20, 2010, entitled "Hydrogen Filling System and Method of Operating the Same." The contents of this application are incorporated herein by reference in their entirety.

BACKGROUND OF THE INVENTION

1. Field of the Invention

The present invention relates to a hydrogen filling system and a method of operating the same.

2. Description of the Related Art

A typical fuel cell vehicle carries a polymer electrolyte fuel cell. This fuel cell obtains direct-current energy by a supply of fuel gas (gas mainly containing hydrogen, e.g., hydrogen gas) to an anode-side electrode and a supply of oxidant gas (gas mainly oxygen, e.g., air) to a cathode-side electrode.

Generally, a water electrolysis device is used in producing hydrogen gas being fuel gas. The water electrolysis device employs a solid polymer electrolyte membrane (ion exchange membrane) to decompose water into hydrogen (and oxygen). An electrode catalyst layer is disposed on each of the opposite sides of the solid polymer electrolyte membrane to form an electrolysis membrane and electrode structure, and a feeder is provided to each of the opposite sides of the electrolysis membrane and electrode structure to form a unit. That is, the unit is configured substantially the same as the above-described fuel cell.

Various kinds of hydrogen filling systems for filling a fuel gas tank mounted on a fuel cell vehicle with hydrogen gas produced by a water electrolysis device are available. One such example described in Japanese Unexamined Patent Application Publication No. 2005-69332 is a hydrogen supplying station 2 for filling an on-vehicle tank 1 with hydrogen, as illustrated in FIG. 6.

The hydrogen supplying station 2 includes a tank unit 4 for storing hydrogen in a plurality of storage tanks 3 having different pressure stages Pt for stored hydrogen, a supply line 5 for use in supplying the hydrogen stored in the tank unit 4 to the on-vehicle tank 1, and a switching device 6 for switching a storage tank 3 connected to the supply line 5 to another storage tank 3.

The hydrogen supplying station 2 is configured to sequentially switch the storage tank 3 connected to the supply line 5 to the storage tanks 3 having higher pressure stages Pt by manipulating the switching device 6 as filling the on-vehicle tank 1 with hydrogen proceeds.

SUMMARY OF THE INVENTION

According to one aspect of the present invention, a hydrogen filling system to fill a hydrogen fuel tank mounted on a fuel cell vehicle with hydrogen includes a high-pressure water electrolysis device, a filling mechanism, a hydrogen pipe, at least one hydrogen storage tank, a first valve mechanism, a bypass pipe, and a second valve mechanism. The high-pressure water electrolysis device is capable of electrolyzing water by supplying electric current from a direct-current power source to produce oxygen and the hydrogen having substantially a same pressure as a maximum filling pressure of the hydrogen fuel tank. The filling mechanism is to fill the hydrogen fuel tank with the hydrogen. The hydrogen pipe connects the filling mechanism and the high-pressure water electrolysis device. The at least one hydrogen storage tank is provided to the hydrogen pipe to store the hydrogen produced by the high-pressure water electrolysis device at substantially the same pressure as the maximum filling pressure of the hydrogen fuel tank. The first valve mechanism is arranged downstream of the at least one hydrogen storage tank to allow the hydrogen to flow only from the hydrogen storage tank to the filling mechanism. The bypass pipe is provided to the hydrogen pipe and connects the high-pressure water electrolysis device and the filling mechanism to bypass the at least one hydrogen storage tank and the first valve mechanism. The second valve mechanism is arranged on the bypass pipe to allow the hydrogen to flow only from the high-pressure water electrolysis device to the filling mechanism.

According to another aspect of the present invention, a method of operating a hydrogen filling system includes providing the hydrogen filling system to fill a hydrogen fuel tank mounted on a fuel cell vehicle with hydrogen. The hydrogen filling system includes a high-pressure water electrolysis device, a filling mechanism, a hydrogen pipe, at least one hydrogen storage tank, and a bypass pipe. The high-pressure water electrolysis device is capable of electrolyzing water by supplying electric current from a direct-current power source to produce oxygen and the hydrogen having substantially a same pressure as a maximum filling pressure of the hydrogen fuel tank. The filling mechanism is to fill the hydrogen fuel tank with the hydrogen. The hydrogen pipe connects the filling mechanism and the high-pressure water electrolysis device. The at least one hydrogen storage tank is provided to the hydrogen pipe to store the hydrogen produced by the high-pressure water electrolysis device at substantially the same pressure as the maximum filling pressure of the hydrogen fuel tank. The bypass pipe is provided to the hydrogen pipe and connecting the high-pressure water electrolysis device and the filling mechanism to bypass the at least one hydrogen storage tank. The method includes connecting the filling mechanism and the hydrogen fuel tank to fill the hydrogen fuel tank with the hydrogen from the at least one hydrogen storage tank and to fill the hydrogen fuel tank with the hydrogen produced by operation of the high-pressure water electrolysis device through the bypass pipe. The at least one hydrogen storage tank is disconnected from the hydrogen pipe to fill the hydrogen fuel tank with only the hydrogen from the high-pressure water electrolysis device when an internal pressure of the at least one hydrogen storage tank is substantially a same as an internal pressure of the hydrogen fuel tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
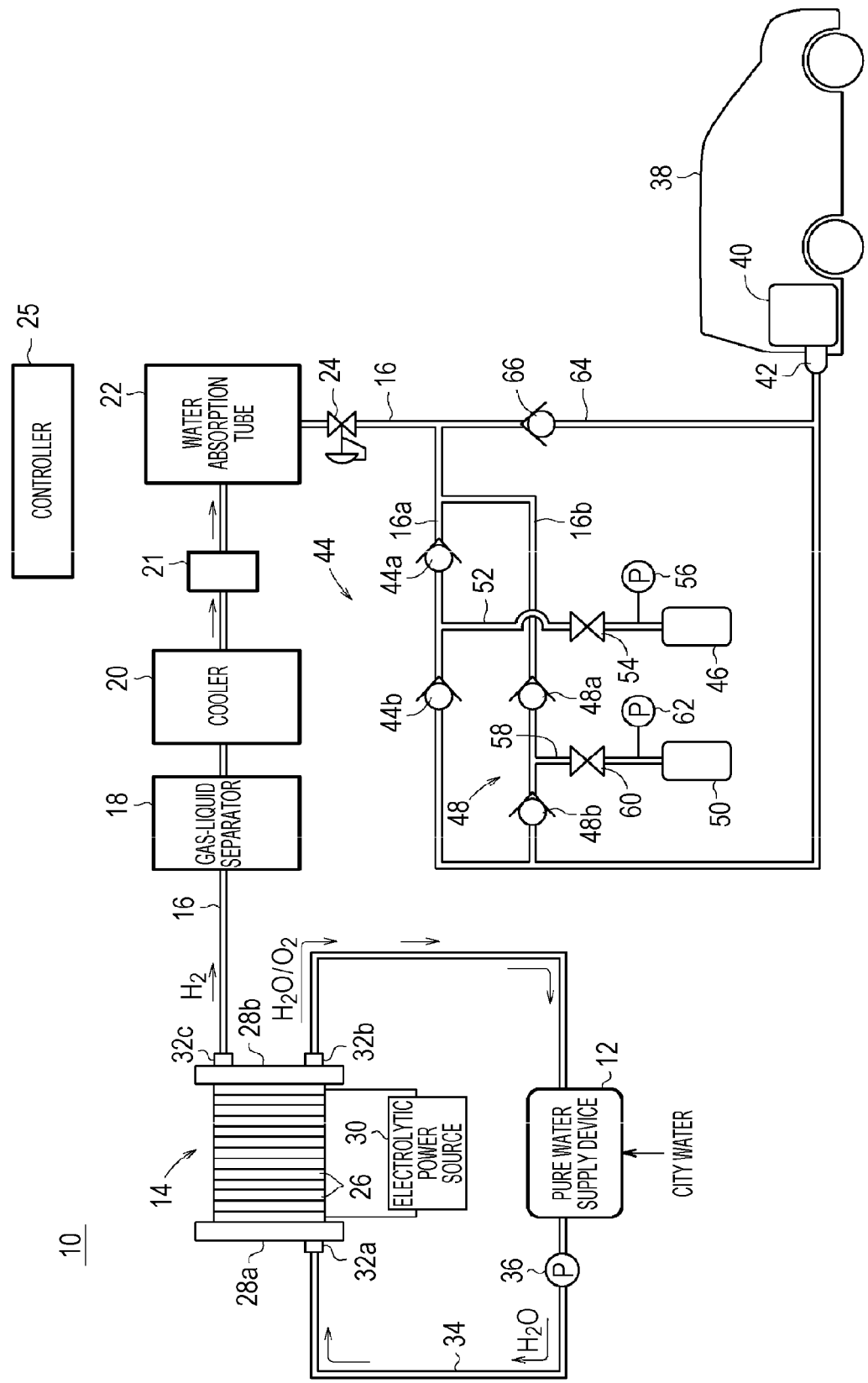
FIG. 1 illustrates a schematic diagram of a hydrogen filling system according to an embodiment of the present invention.

The embodiments will now be described with reference to the accompanying drawings, wherein like reference numerals designate corresponding or identical elements throughout the various drawings.

As illustrated in FIG. 1, a hydrogen filling system 10 according to an embodiment of the present invention includes a high-pressure water electrolysis device 14, a gas-liquid separator 18, a cooler (e.g., Peltier element) 20, a drain separator 21, a water absorption tower 22, and a back pressure valve 24. The high-pressure water electrolysis device 14 receives a supply of pure water made from commercial water through a pure-water supply device 12 and produces hydrogen by electrolyzing the pure water. The gas-liquid separator 18 removes moisture contained in the high-pressure hydrogen guided from the high-pressure water electrolysis device 14 to a hydrogen pipe 16. The cooler 20 cools hydrogen ejected from the gas-liquid separator 18. The drain separator 21 removes cooled moisture (water droplets) ejected from the cooler 20. The water absorption tower 22 absorbs moisture contained in the hydrogen and removes it. The back pressure valve 24 is arranged downstream of the water absorption tower 22 and keeps the hydrogen ejected to the hydrogen pipe 16 at pressure higher than normal, for example, at approximately 20 MPa to 35 MPa. In addition, the pressure of the hydrogen ejected to the hydrogen pipe 16 is not limited to 35 Mpa. The pressure may be maintained at approximately 70 Mpa. The hydrogen filling system 10 is controlled by a controller 25.

The high-pressure water electrolysis device 14 includes a plurality of water electrolysis cells 26 being stacked and end plates 28a and 28b provided to the opposite ends in the direction in which the water electrolysis cells 26 are stacked. The high-pressure water electrolysis device 14 is connected to an electrolytic power source 30 being a direct-current power source. The high-pressure water electrolysis device 14 has an anode connected to the positive electrode of the electrolytic power source 30 and a cathode connected to the negative electrode of the electrolytic power source 30.

The end plate 28a is connected to a pipe 32a, and the end plate 28b is connected to pipes 32b and 32c. The pipes 32a and 32b is connected to a circulation route 34, pure water is circulated from the pure-water supply device 12 through the pipes 32a and 32b and a water pump 36 provided in the circulation route 34. The pipe 32c is a hydrogen outlet and is connected to the gas-liquid separator 18 with the hydrogen pipe 16 disposed therebetween.

The water absorption tower 22 includes an absorption tube (not illustrated) filled with moisture absorbent for absorbing water vapor (moisture) contained in hydrogen by physical absorption, releasing the moisture to the outside, and being restored. The downstream side (exit side) of the water absorption tower 22 is connected to the hydrogen pipe 16 through the back pressure valve 24. In place of the back pressure valve 24, various kinds of valves, including an electromagnetic valve, may also be used.

The hydrogen pipe 16 is provided with a nozzle portion (filling mechanism) 42 for filling a hydrogen fuel tank 40 of a fuel cell vehicle 38 therethrough at its downstream end (distal end). The nozzle portion 42 incorporates a valve mechanism (not illustrated). The valve mechanism is opened when the nozzle portion 42 is connected to the hydrogen fuel tank 40, and it is closed when the nozzle portion 42 is separated from the hydrogen fuel tank 40 to keep the inside of the hydrogen pipe 16 at high pressure. The hydrogen pipe 16 branches to a first pipe section 16a and a second pipe section 16b, and they join into the hydrogen pipe 16.

The first pipe section 16a is provided with a first-first valve mechanism 44 and a first hydrogen storage tank 46. The second pipe section 16b is provided with a second-first valve mechanism 48 and a second hydrogen storage tank 50.

The first-first valve mechanism 44 includes first check valves 44a and 44b for allowing hydrogen to flow into only its downstream side along the first pipe section 16a. The first check valves 44a and 44b are arranged in series. A first supply and exhaust channel 52 includes a first end between the first check valves 44a and 44b and a second end connected to the first hydrogen storage tank 46 through a first opening and closing valve 54. The first hydrogen storage tank 46 is provided with a first pressure sensor 56.

The second-first valve mechanism 48 includes first check valves 48a and 48b for allowing hydrogen to flow into only its downstream side along the second pipe section 16b. The first check valves 48a and 48b are arranged in series. A second supply and exhaust channel 58 includes a first end between the first check valves 48a and 48b and a second end connected to the second hydrogen storage tank 50 through a second opening and closing valve 60. The second hydrogen storage tank 50 is provided with a second pressure sensor 62.

The hydrogen pipe 16 is connected to a bypass pipe 64 that bypasses the first and second pipe sections 16a and 16b (more specifically, bypasses the first-first valve mechanism 44, second-first valve mechanism 48, first hydrogen storage tank 46, and second hydrogen storage tank 50). The bypass pipe 64 is provided with a second valve mechanism for allowing only hydrogen from the water absorption tower 22 toward the nozzle portion 42 to pass therethrough, for example, a second check valve 66.

The capacity V1 of the hydrogen fuel tank 40, the capacity V2 of the first hydrogen storage tank 46, and the capacity V3 of the second hydrogen storage tank 50 are set to the relationship $V1 \geq V2+V3$. For the sake of simplification of the description, $V1=V2+V3$ and $V2=V3$ can be assumed, for example.

The maximum filling pressure of the hydrogen fuel tank 40, the pressure of hydrogen produced by the high-pressure water electrolysis device 14, and the maximum filling pressure of hydrogen stored in the first hydrogen storage tank 46 and the second hydrogen storage tank 50 are set to substantially the same pressure.

Figure 2:
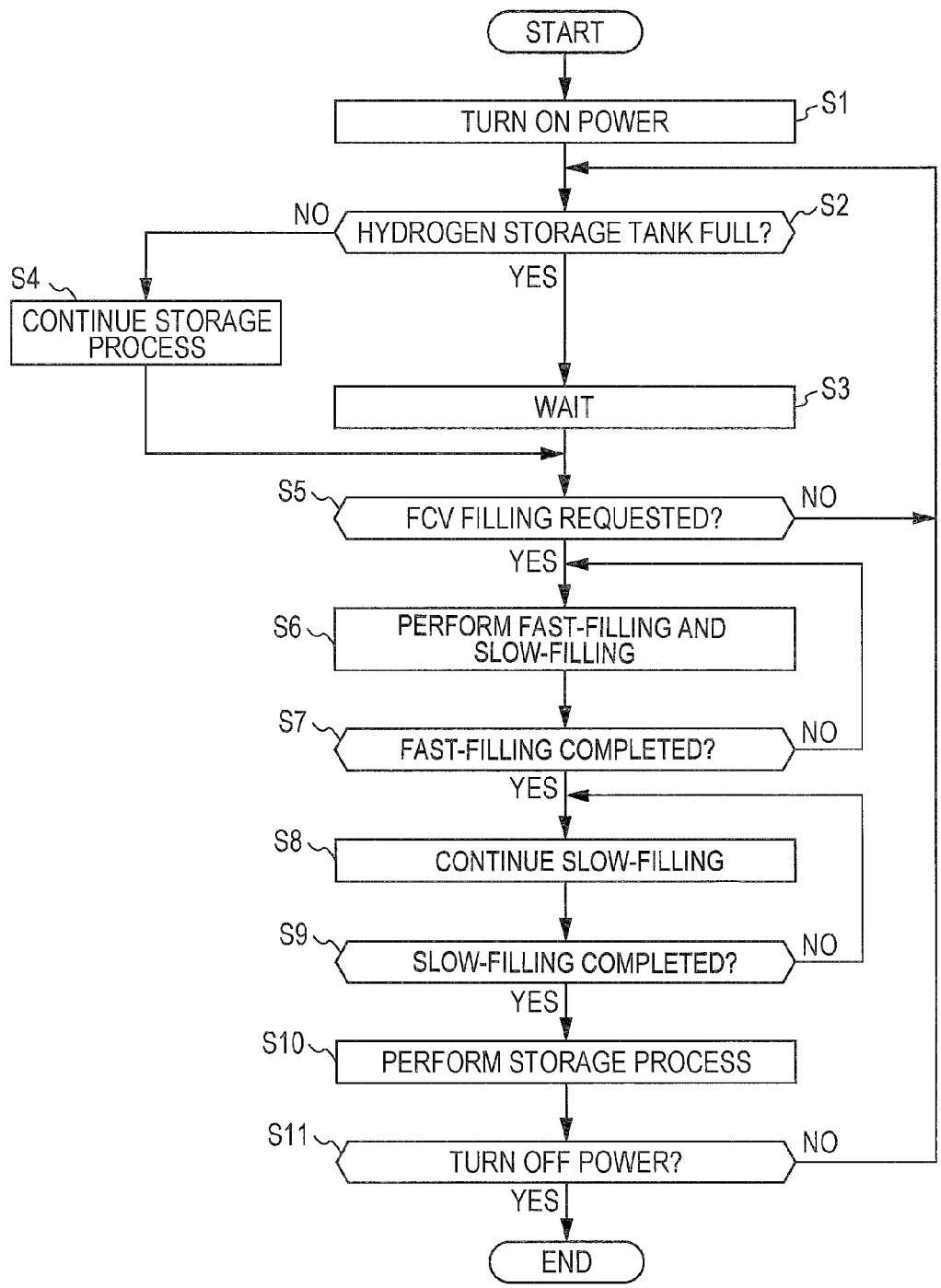
FIG. 2 is a flowchart for describing a method of operating the hydrogen filling system.

How the hydrogen filling system 10 having the above-described configuration works is described below in relation to an operating method according to the present embodiment with reference to the flowchart illustrated in FIG. 2.

First, the start power of the hydrogen filling system 10 is turned on to start (actuate) the hydrogen filling system 10 (step S1). In response to this, pure water made from commercial water through pure-water supply device 12 is supplied to the high-pressure water electrolysis device 14, as illustrated in FIG. 1. The high-pressure water electrolysis device 14 electrolyzes pure water and starts producing hydrogen by the passage of current from the electrolytic power source 30.

The hydrogen produced in the high-pressure water electrolysis device 14 is sent to the gas-liquid separator 18 through the hydrogen pipe 16. The gas-liquid separator 18 separates water vapor contained in the hydrogen from that hydrogen. The hydrogen from which water vapor has been removed is sent to the water absorption tower 22 through the cooler 20, whereas water droplets compressed by cooling are removed by the drain separator 21.

The water absorption tower 22 acquires hydrogen in a dry state in which water vapor contained in the hydrogen has been absorbed (dry hydrogen). Because the back pressure valve 24 is provided downstream of the water absorption tower 22, the hydrogen can be pressurized and kept in the water absorption tower 22 until the pressure of the hydrogen in the water absorption tower 22 reaches a set pressure.

When the pressure of the hydrogen in the water absorption tower 22 reaches the set pressure, the back pressure valve 24 is also opened and the dry hydrogen (hereinafter also referred to simply as hydrogen) is guided from the water absorption tower 22 to the hydrogen pipe 16. The hydrogen pipe 16 is filled with the hydrogen guided thereto, and the hydrogen is guided to the first pipe section 16a and the second pipe section 16b.

Here, for example, if the first hydrogen storage tank 46 and the second hydrogen storage tank 50 are not filled with the hydrogen by only a specific amount, first, the first opening and closing valve 54 is opened and the second opening and closing valve 60 is closed. Thus the hydrogen guided to the first pipe section 16a passes through the first check valve 44a, flows into the first supply and exhaust channel 52, and is supplied to the first hydrogen storage tank 46.

When reaching a specific pressure by the hydrogen pressure in the first hydrogen storage tank 46 is detected by, for example, the first pressure sensor 56, the first opening and closing valve 54 is closed and the second opening and closing valve 60 is opened. Accordingly, the hydrogen guided to the second pipe section 16b passes through the first check valve 48a, flows into the second supply and exhaust channel 58, and is supplied to the second hydrogen storage tank 50. Reaching a specific pressure by the hydrogen pressure in the second hydrogen storage tank 50 is detected by, for example, the second pressure sensor 62.

When it is determined that the first hydrogen storage tank 46 and the second hydrogen storage tank 50 are full (YES in step S2), the processing proceeds to step S3, where the hydrogen filling system 10 moves to a stand-by state. In contrast, when it is determined that the first hydrogen storage tank 46 and the second hydrogen storage tank 50 are not full (NO in step S2), the processing proceeds to step S4, where the above-described hydrogen storage process continues.

When a request to fill the hydrogen fuel tank 40 of the fuel cell vehicle 38 with hydrogen is issued (YES in step S5), the processing proceeds to step S6. This hydrogen filling request can be issued by a fill signal sent to the controller 25 by the pressing of a fill button (not illustrated) by a user, or alternatively, can be issued by a signal indicating that the nozzle portion 42 has become connected to the hydrogen fuel tank 40 of the fuel cell vehicle 38 to the controller 25, for example.

In step S6, the hydrogen fuel tank 40 is filled with hydrogen supplied from the first hydrogen storage tank 46 and the second hydrogen storage tank 50 and filled with hydrogen produced by operation of the high-pressure water electrolysis device 14 substantially simultaneously.

Here, because filling the hydrogen fuel tank 40 with hydrogen supplied from the first hydrogen storage tank 46 and the second hydrogen storage tank 50 uses a differential hydrogen pressure in each of the first hydrogen storage tank 46 and the second hydrogen storage tank 50, the hydrogen fuel tank 40 is immediately filled with a large quantity of hydrogen flow (fast-filling). In contrast, the hydrogen produced by electrolytic reaction by operation of the high-pressure water electrolysis device 14 is simply flown into the hydrogen fuel tank 40 (slow-filling), so the quantity of hydrogen flow is significantly smaller, in comparison with when the differential hydrogen pressure in the tank is used.

Figure 3:
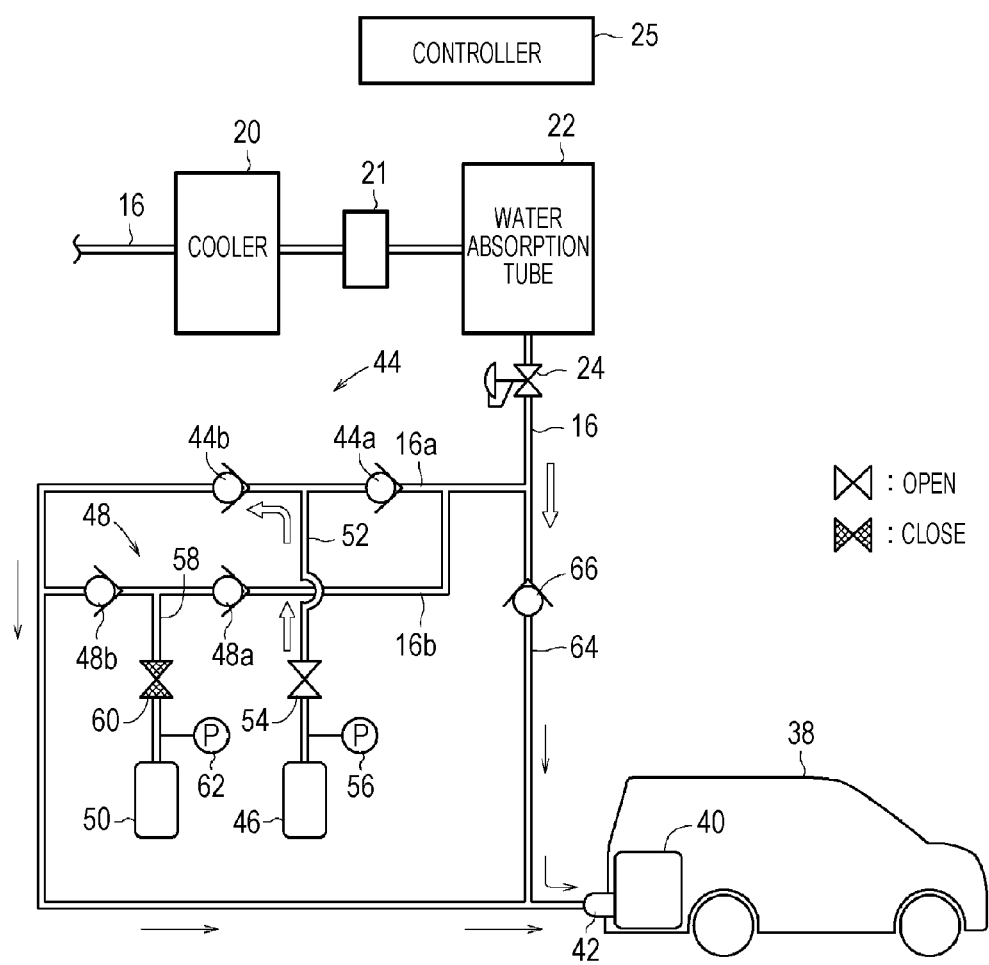
FIG. 3 illustrates how the hydrogen filling system works.

Specifically, as illustrated in FIG. 3, the first opening and closing valve 54 is opened, whereas the second opening and closing valve 60 is closed. This cause hydrogen stored in the first hydrogen storage tank 46 to be guided from the first supply and exhaust channel 52 to the first pipe section 16a and can enable a high hydrogen pressure M1 to be applied toward the nozzle portion 42 under the action of the first check valves 44a and 44b. The first hydrogen storage tank 46 has been previously filled at the hydrogen with the maximum filling pressure M1.

The high-pressure water electrolysis device 14 produces hydrogen. Thus, the high hydrogen pressure M1 toward the nozzle portion 42 is applied through the back pressure valve 24 to the second check valve 66, which is provided between the hydrogen pipe 16 and the bypass pipe 64.

Accordingly, the high hydrogen pressure M1 is applied to the downstream side of the first check valve 44b and the downstream side of the second check valve 66. Thus, when the nozzle portion 42 becomes connected to the hydrogen fuel tank 40 whose hydrogen pressure M2 is relatively low (M2<M1), the hydrogen fuel tank 40 is filled with hydrogen from the first hydrogen storage tank 46 by fast-filling and filled with hydrogen from the high-pressure water electrolysis device 14 by slow-filling in a substantially simultaneous manner.

When the above-described filling process continues, the hydrogen pressure M2 in the hydrogen fuel tank 40 rises, whereas the hydrogen pressure M1 in the first hydrogen storage tank 46 decreases. When the first pressure sensor 56 detects that the hydrogen pressure M2 is substantially equal to the hydrogen pressure M1, for example, M2=M1, the first opening and closing valve 54 is closed and the second opening and closing valve 60 is opened.

Figure 4:
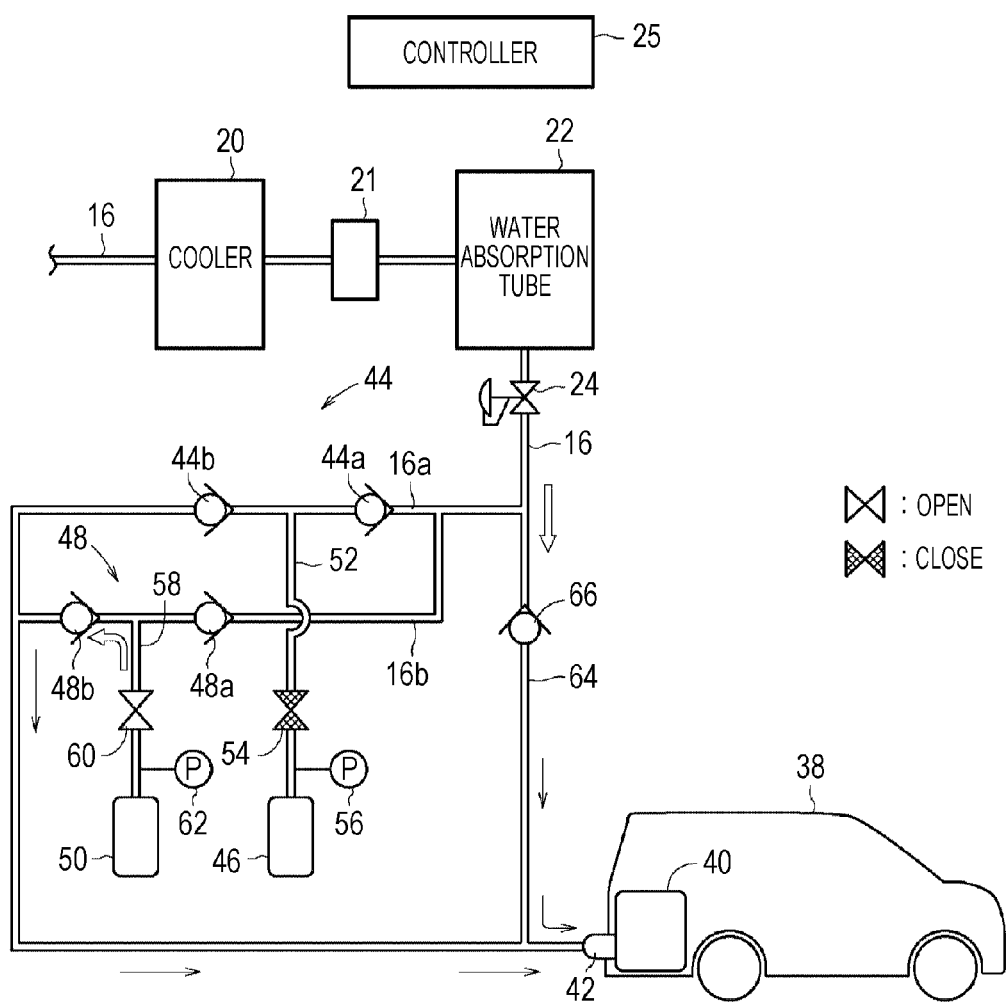
FIG. 4 illustrates how the hydrogen filling system works.

Then, as illustrated in FIG. 4, the hydrogen stored in the second hydrogen storage tank 50 is guided from the second supply and exhaust channel 58 to the second pipe section 16b, and the high hydrogen pressure M1 is applied toward the nozzle portion 42 under the action of the first check valves 48a and 48b. Accordingly, the hydrogen fuel tank 40 can be filled with hydrogen from the second hydrogen storage tank 50 by fast-filling and filled with hydrogen from the high-pressure water electrolysis device 14 by slow-filling in a substantially simultaneous manner.

Figure 5:
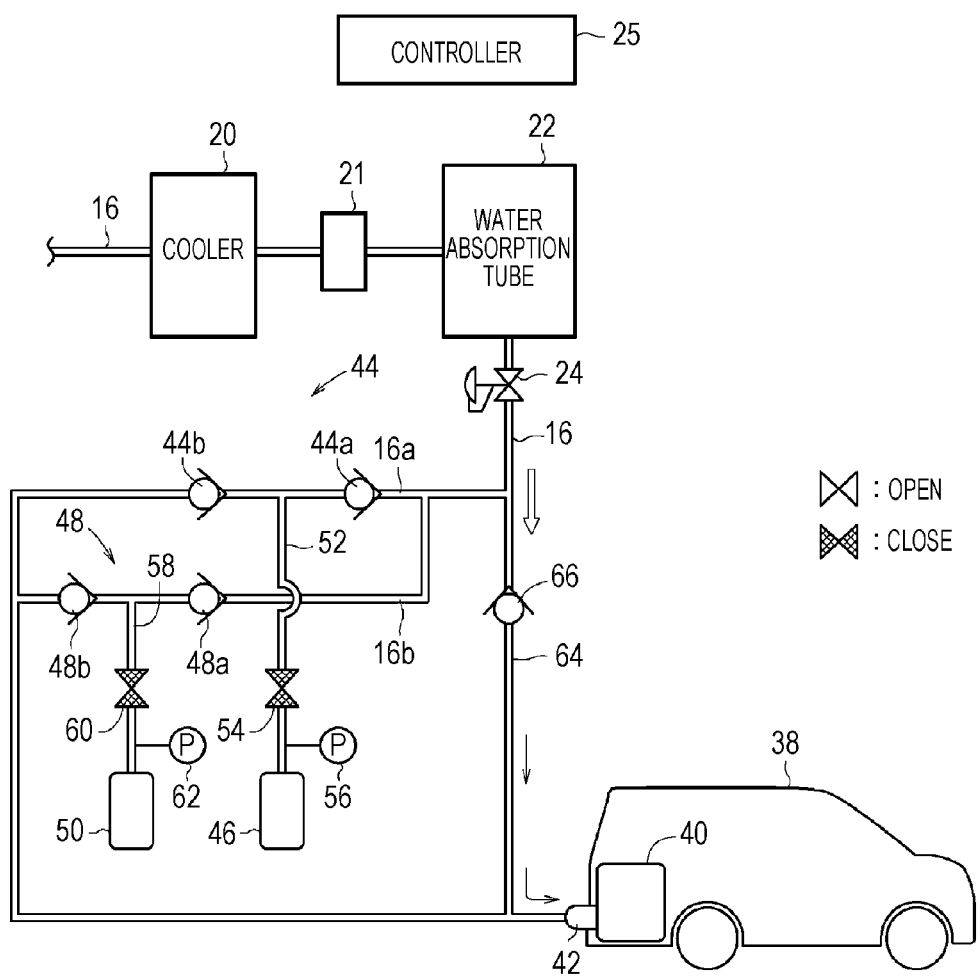
FIG. 5 illustrates how the hydrogen filling system works.
Figure 6:
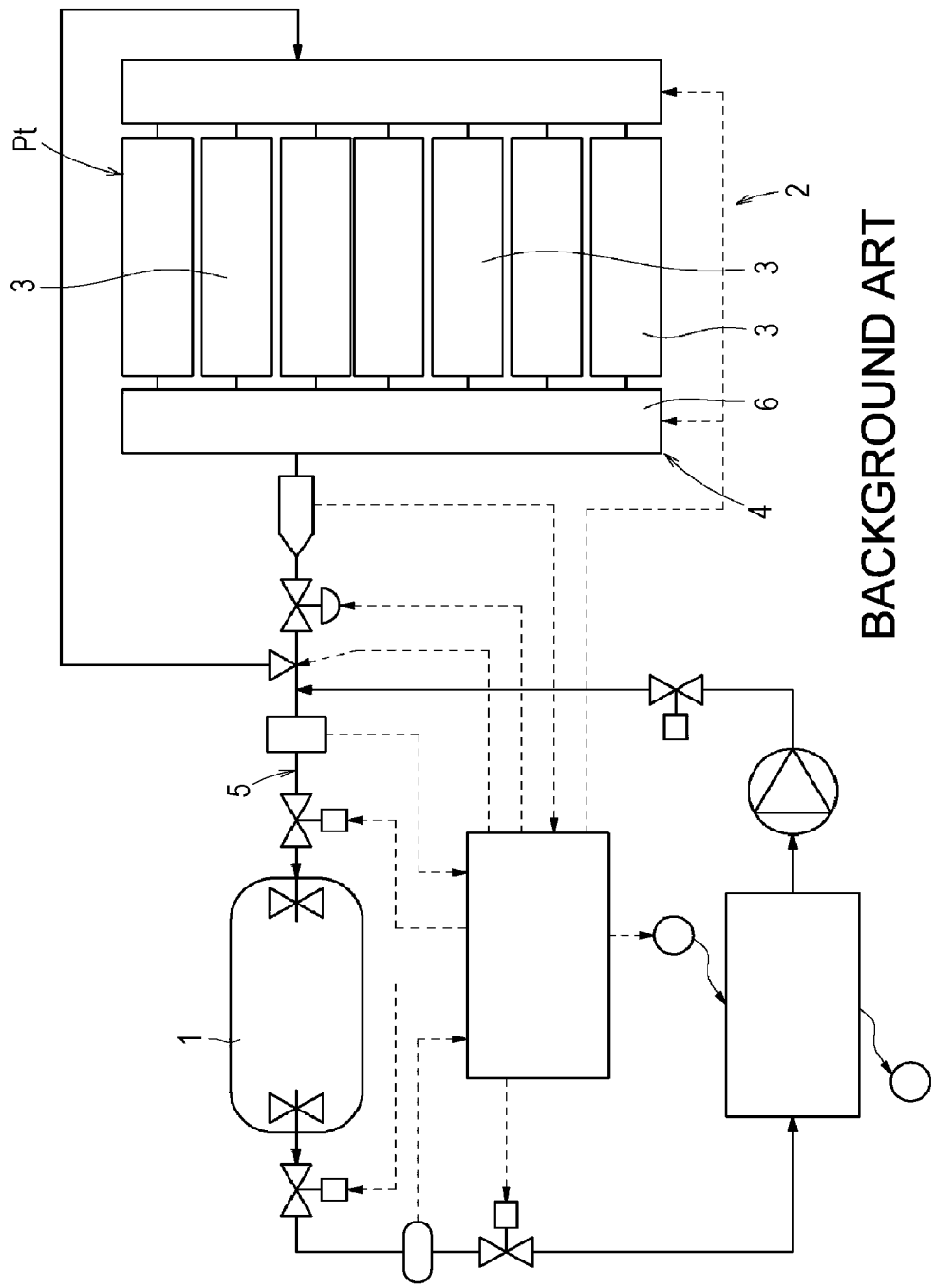
FIG. 6 illustrates a schematic diagram of a hydrogen supplying station disclosed in the related art.

When the fast-filling with hydrogen from the second hydrogen storage tank 50 is completed (YES in step S7), the processing proceeds to step S8, where the second opening and closing valve 60 is closed and only the slow-filling with hydrogen from the high-pressure water electrolysis device 14 performed on the hydrogen fuel tank 40 continues (see FIG. 5).

Then, when the process of filling the hydrogen fuel tank 40 with hydrogen is completed (YES in step S9), the processing proceeds to step S10, where the hydrogen from the high-pressure water electrolysis device 14 is stored in the first hydrogen storage tank 46 and the second hydrogen storage tank 50. When the start power of the hydrogen filling system 10 is turned off, the operation of the hydrogen filling system 10 stops (YES in step S11).

In this case, for the present embodiment, the hydrogen fuel tank 40 can be filled with hydrogen from the first hydrogen storage tank 46 (or second hydrogen storage tank 50) and filled with hydrogen from the high-pressure water electrolysis device 14 through the bypass pipe 64 substantially simultaneously. Thus, an advantageous effect of enabling the hydrogen fuel tank 40 to be easily and speedily filled with hydrogen is obtainable.

In addition, the high-pressure water electrolysis device 14 can produce hydrogen at substantially the same pressure as the maximum filling pressure of the hydrogen fuel tank 40, and the first hydrogen storage tank 46 and the second hydrogen storage tank 50 can store that hydrogen at substantially the same pressure as the maximum filling pressure of the hydrogen fuel tank 40. This can eliminate the necessity to raise the pressure of the hydrogen by the use of, for example, a mechanical compressor and can reduce consumption energy as much as possible. Accordingly, needless energy consumption can be suppressed, thus resulting in cost savings.

Additionally, the capacity V1 of the hydrogen fuel tank 40, the capacity V2 of the first hydrogen storage tank 46, and the capacity V3 of the second hydrogen storage tank 50 are set to the relationship V1≥V2+V3. More specifically, the relationship V1=V2+V3 and V2=V3 can be established.

Here, a case is assumed in which, when the hydrogen fuel tank 40 has the capacity V1 and the hydrogen pressure 0 kPa, each of the first hydrogen storage tank 46 and the second hydrogen storage tank 50 has the capacity 1/2V1 and the hydrogen pressure M kPa.

First, when the hydrogen fuel tank 40 is filled with hydrogen from the first hydrogen storage tank 46, from 1/2V1×M=(1/2V1+V1)×n (hydrogen pressure), n=1/3M (kPa) is obtained. Then, when the hydrogen fuel tank 40 is filled with hydrogen from the second hydrogen storage tank 50, from 1/2V1×M+1/3M×V1=3/2V1×n (hydrogen pressure), n=0.55 . . . M(kPa) is obtainable.

In contrast to this, when a single hydrogen storage tank is used and this hydrogen storage tank has the capacity V1 and the hydrogen pressure M kPa, the hydrogen fuel tank 40 after it has been filled with hydrogen has the hydrogen pressure 0.5M kPa.

Accordingly, for the present embodiment, the filling pressure can be increased by approximately 10 percent, in comparison with when a single hydrogen storage tank is used, and an advantageous effect of efficiently reducing the time required to fill up the hydrogen fuel tank 40 by enhanced fast-filling is obtainable.

For the present embodiment, the first hydrogen storage tank 46 and the second hydrogen storage tank 50 are included as a hydrogen storage tank. However, the number of hydrogen storage tanks is not limited to two. Three or more hydrogen storage tanks may be included. In such cases, the total capacity of all the hydrogen storage tanks is set to at or below the capacity of the hydrogen fuel tank 40.

With the embodiments of the present invention, the hydrogen fuel tank can be filled with the hydrogen from the hydrogen storage tank and filled with the hydrogen from the high-pressure water electrolysis device through the bypass pipe substantially simultaneously. Therefore, the hydrogen fuel tank can be filled with hydrogen easily and speedily.

In addition, the high-pressure water electrolysis device can produce hydrogen having substantially the same pressure as the maximum filling pressure of the hydrogen fuel tank, and the hydrogen storage tank can store the hydrogen at substantially the same pressure as the maximum filling pressure of the hydrogen fuel tank. This eliminates the need to raise the pressure of the hydrogen by the use of, for example, a mechanical compressor and can reduce consumption energy as much as possible. Accordingly, needless energy consumption can be suppressed, thus resulting in cost savings.

Obviously, numerous modifications and variations of the present invention are possible in light of the above teachings. It is therefore to be understood that within the scope of the appended claims, the invention may be practiced otherwise than as specifically described herein.

What is claimed is:

1. A hydrogen filling system to fill a hydrogen fuel tank mounted on a fuel cell vehicle with hydrogen, the hydrogen filling system comprising:
   a high-pressure water electrolysis device capable of electrolyzing water by supplying electric current from a direct-current power source to produce oxygen and the hydrogen having substantially a same pressure as a maximum filling pressure of the hydrogen fuel tank;
   a filling mechanism to fill the hydrogen fuel tank with the hydrogen;
   a hydrogen pipe connecting the filling mechanism and the high-pressure water electrolysis device;
   at least one hydrogen storage tank provided to the hydrogen pipe to store the hydrogen produced by the high-pressure water electrolysis device at substantially the same pressure as the maximum filling pressure of the hydrogen fuel tank, a capacity of the at least one hydrogen storage tank is smaller than or equal to a capacity of the hydrogen fuel tank;
   a first valve mechanism arranged downstream of the at least one hydrogen storage tank to allow the hydrogen to flow from the hydrogen storage tank to the filling mechanism;
   a bypass pipe provided to the hydrogen pipe and connecting the high-pressure water electrolysis device and the filling mechanism to bypass the hydrogen storage tank and the first valve mechanism; and
   a second valve mechanism arranged on the bypass pipe to allow the hydrogen to flow only from the high-pressure water electrolysis device to the filling mechanism,
   wherein the system is configured to completely fill the hydrogen fuel tank from the high-pressure water electrolysis device and the at least one hydrogen storage tank without a compressor.

2. The hydrogen filling system according to claim 1, wherein each of the first valve mechanism and the second valve mechanism includes a check valve.

3. The hydrogen filling system according to claim 2, wherein the at least one hydrogen storage tank comprises a plurality of hydrogen storage tanks, and a total capacity of the plurality of hydrogen storage tanks is smaller than or equal to a capacity of the hydrogen fuel tank.

4. The hydrogen filling system according to claim 1, wherein the at least one hydrogen storage tank comprises a plurality of hydrogen storage tanks, and a total capacity of the plurality of hydrogen storage tanks is smaller than or equal to a capacity of the hydrogen fuel tank.

5. The hydrogen filling system according to claim 1, wherein the at least one hydrogen storage tank comprises a plurality of hydrogen storage tanks, and wherein a maximum filling pressure of each of the hydrogen storage tanks is substantially the same.

6. The hydrogen filling according to claim 5, wherein a maximum filling pressure of hydrogen stored in each of the hydrogen storage tanks is substantially the same as the maximum filling pressure of the hydrogen fuel tank.

7. The hydrogen filling system according to claim 1, wherein the at least one hydrogen storage tank comprises a plurality of hydrogen storage tanks, and an individual capacity of each of the storage tanks is substantially equal.

8. The hydrogen filling system according to claim 7, wherein the maximum filling pressure of hydrogen stored in each of the hydrogen storage tanks is substantially the same as the maximum filling pressure of the hydrogen fuel tank.

9. The hydrogen filling system according to claim 8, wherein each of the hydrogen storage tanks is connected to a respective one of a plurality of opening and closing valves.

10. The hydrogen filling system according to claim 1, wherein the system is configured to fill the hydrogen fuel tank from the high-pressure water electrolysis device and the at least one hydrogen storage tank substantially simultaneously.

11. A method of operating a hydrogen filling system, the method comprising:
providing the hydrogen filling system to fill a hydrogen fuel tank mounted on a fuel cell vehicle with hydrogen, the hydrogen filling system comprising:
a high-pressure water electrolysis device capable of electrolyzing water by supplying electric current from a direct-current power source to produce oxygen and the hydrogen having substantially a same pressure as a maximum filling pressure of the hydrogen fuel tank;
a filling mechanism to fill the hydrogen fuel tank with the hydrogen;
a hydrogen pipe connecting the filling mechanism and the high-pressure water electrolysis device;
at least one hydrogen storage tank provided to the hydrogen pipe to store the hydrogen produced by the high-pressure water electrolysis device at substantially the same pressure as the maximum filling pressure of the hydrogen fuel tank, a capacity of the at least one hydrogen storage tank is smaller than or equal to a capacity of the hydrogen fuel tank; and
a bypass pipe provided to the hydrogen pipe and connecting the high-pressure water electrolysis device and the filling mechanism to bypass the hydrogen storage tank;
connecting the filling mechanism and the hydrogen fuel tank to fill the hydrogen fuel tank with the hydrogen from the at least one hydrogen storage tank and to fill the hydrogen fuel tank with the hydrogen produced by operation of the high-pressure water electrolysis device through the bypass pipe; and
disconnecting the at least one hydrogen storage tank from the hydrogen pipe to completely fill the hydrogen fuel tank with only the hydrogen from the high-pressure water electrolysis device without the use of a compressor when an internal pressure of the at least one hydrogen storage tank is substantially a same as an internal pressure of the hydrogen fuel tank.

12. The method according to claim 11, further comprising:
providing a first valve mechanism arranged downstream of the at least one hydrogen storage tank to allow the hydrogen to flow from the at least one hydrogen storage tank to the filling mechanism; and
providing a second valve mechanism arranged on the bypass pipe to allow the hydrogen to flow only from the high-pressure water electrolysis device to the filling mechanism.

13. The method according to claim 11, wherein the at least one hydrogen storage tank comprises a plurality of hydrogen storage tanks, and a total capacity of the plurality of hydrogen storage tanks is smaller than or equal to a capacity of the hydrogen fuel tank.

14. The method according to claim 11, wherein the at least one hydrogen storage tank comprises a plurality of hydrogen storage tanks, and a maximum filling pressure of each of the hydrogen storage tanks is substantially the same.

15. The method according to claim 14, wherein the maximum filling pressure of hydrogen stored in each of the hydrogen storage tanks is substantially the same as the maximum filling pressure of the hydrogen fuel tank.

16. The method according to claim 14, wherein each of the hydrogen storage tanks is connected to a respective one of a plurality of opening and closing valves.

17. The method according to claim 11, further comprising filling the hydrogen fuel tank the high-pressure water electrolysis device and the at least one hydrogen storage tank substantially simultaneously.

* * * * *